Dec. 11, 1928.
R. P. JACQUES
1,695,263
FLEXIBLE TUBULAR CONDUIT
Filed June 7, 1927
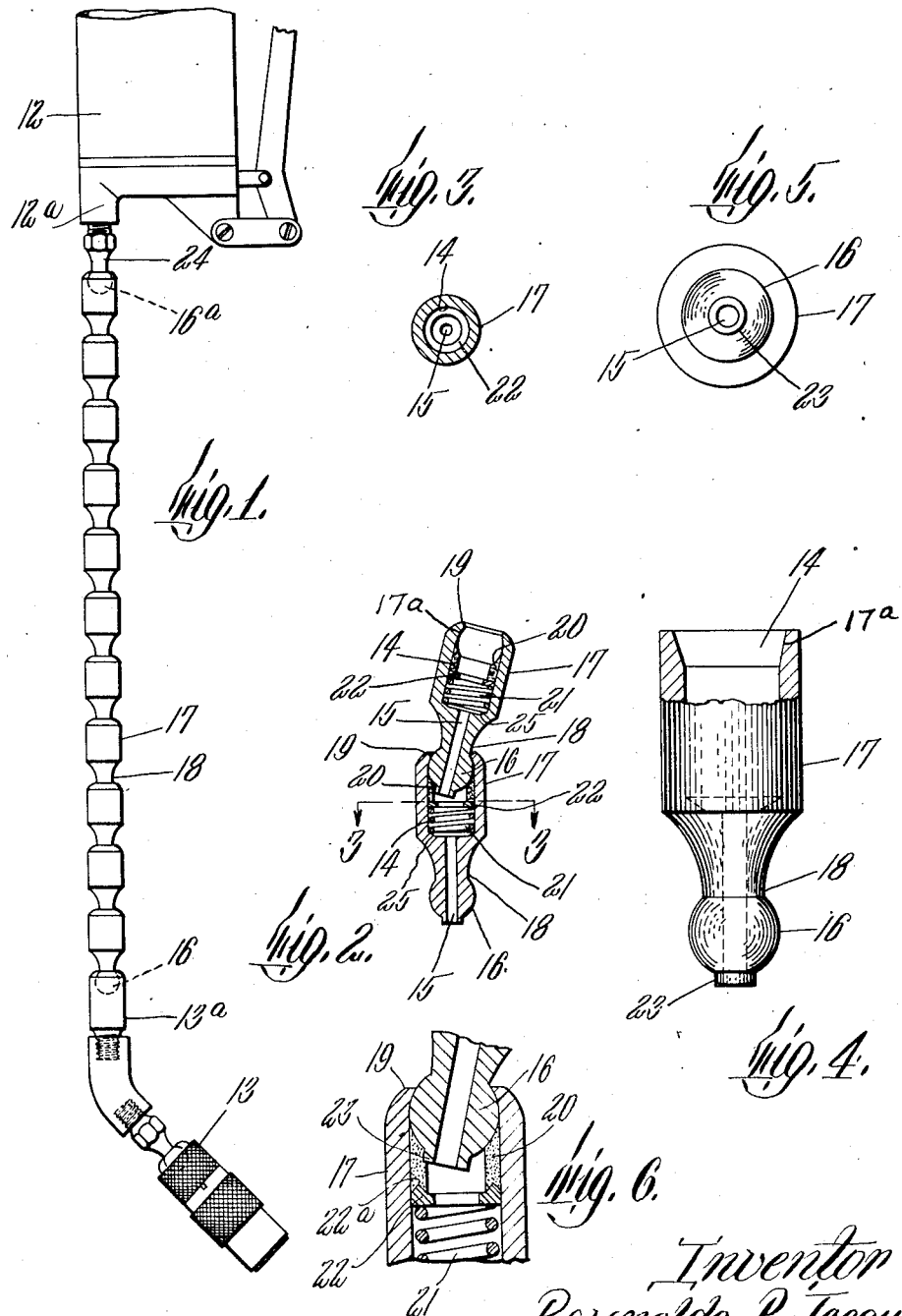

Patented Dec. 11, 1928.

1,695,263

UNITED STATES PATENT OFFICE.

RAYNALDO P. JACQUES, OF WOONSOCKET, RHODE ISLAND, ASSIGNOR TO ADAMS INDUSTRIES, INC., OF NEW YORK, N. Y., A CORPORATION OF NEW YORK.

FLEXIBLE TUBULAR CONDUIT.

Application filed June 7, 1927. Serial No. 197,129.

This invention relates to a flexible delivering conduit which may be employed to conduct a lubricant under pressure, such as grease from a grease gun or pressure system to a fixed receiving cup or nipple communicating with a bearing to be lubricated, or a fluid under pressure, such as steam, air or water.

The object is to provide a conduit which includes a plurality of duplicate tubular one-piece sections or units, connected end to end by ball and socket joints formed by joint members integral with the units, and permitting the desired flexibility of the conduit, each section including, as integral parts thereof, a ball member and a socket member, so that the number of parts of the conduit, as a whole, is reduced to a minimum.

Another object is to provide improved means associated with the conduit sections for packing the joints thereof, to prevent leakage.

Of the accompanying drawings forming a part of this specification,—

Figure 1 is a side view, showing a conduit embodying the invention, connected at its inner end with the delivering portion of a grease gun, and at the opposite end with a terminal for engagement with a fixed oil cup or nipple.

Figure 2 shows in longitudinal section two adjacent units or sections of the conduit.

Figure 3 is a section on line 3—3 of Figure 2.

Figure 4 is a side view of one of the sections, a portion being broken away.

Figure 5 is an end view of the section shown by Figure 4.

Figure 6 is a fragmentary view similar to a portion of Figure 2, showing the followers wedge-shaped.

The same reference characters indicate the same parts in all of the figures.

The flexible conduit shown by the drawings is adapted at one end for connection with the delivering portion 12ª of a grease gun or pressure system 12, and at its opposite free end with a terminal 13, which may be constructed in any suitable manner for detachable engagement with a fixed oil cup or nipple (not shown). The conduit is composed of a plurality of articulated metallic sections of identical form, the form being such that the sections may be produced by an automatic screw machine.

Each section includes a relatively large cylindrical end portion 17, having a relatively large bore 14, and a contracted end zone 17ª constituting the mouth 19 of the bore. Each section also includes a smaller end portion having a ball-shaped terminal 16, a reduced neck 18, and a smaller bore 15. The terminal 16 of each unit is confined in the larger bore 14 of the next unit by the contracted end zone 17ª of the last-mentioned unit, said zone constituting an annular socket member bearing on one side of the inserted terminal 16, the mouth 19 surrounding an opening of larger diameter than the smallest diameter of the neck 18, so that the confined terminal is adapted to turn in contact with the socket member, limited conduit-flexing movements of the connected sections being thus permitted.

The larger bore 14 of each unit contains an annular packing washer 20, preferably of leather, and a washer-pressing spring 21, seated on the inner end 25 of the bore. Said spring presses the washer against the inserted terminal 16, and presses said terminal against the socket member formed by the contracted end zone 17ª. The washer has a beveled outer end conforming closely to one side of the terminal 16, as best shown by Figure 6. An annular metal follower 22 is preferably interposed between the spring and the washer 20, and may have a wedge-shaped side 22ª.

The sections are first formed with the contractible end zone 17ª of each open or uncontracted, as shown by Figure 4, said zone being rendered contractible by forming a beveled inner face thereon, and contracted by any suitable means, after a terminal 16 has been inserted therein. The end of the compressible washer which bears on the terminal 16 is liable to be worn by its contact with the terminal, so that filaments may be formed on the washer end. To prevent the clogging of the bore portion 15 by such filaments, I provide the terminal with a circular protuberance forming an annular shoulder 23 (Figures 4 and 5), concentric with the bore and adapted to bear on the compressible washer when the conduit is flexed, as shown by Figure 2, and thus prevent loose material of the washer from entering the bore 15. This protuberance may be omitted, if desired.

The delivering portion 12ª may be provided with a fixed nipple 24, having a ball shaped terminal 16ª engaged with the section forming the inner end of the flexible conduit. The terminal 13 may be provided with a socketed member 13ª engaging the ball shaped terminal 16 of the section forming the outer end of the flexible conduit.

It will be seen that a swivel-joint is produced during the operation of making the conduit, by the interengagement of the ball-shaped terminal 16 and the socket member formed by the contracted end zone 19, and that said joint permits a limited universal flexure of the conduit between each section and the next, so that the conduit cannot become "kinked", and is adapted to freely assume a straight form after being flexed, and a flexed form after being straightened.

It is obvious that the conduit may be employed to conduct a fluid, the bore portions 15 being suitably proportioned.

A conduit including the one-piece sections or units, each having a contracted mouth 19, integral therewith, has a minimum number of parts, which are adapted to be economically produced and connected, each unit being producible by an automatic machine, the contracted mouth 19 of each section being an integral part of the section.

I claim:

1. A flexible tubular conduit comprising a plurality of duplicate one-piece sections or units, each including a relatively large cylindrical end portion, having a relatively large bore and a contracted end zone constituting the mouth of the bore, and a smaller end portion having a ball-shaped terminal, a reduced neck, and a relatively small bore, the terminal of each section being confined in the larger bore of the next section by the contracted end zone, which constitutes a socket member and is formed to permit limited conduit-flexing movements of said sections.

2. A flexible tubular conduit as specified by claim 1, the larger bore of each section enclosing an annular packing washer and a spring which presses the washer against an inserted terminal, and presses said terminal against the contracted end zone of said section.

3. A flexible tubular conduit as specified by claim 1, the larger bore of each section enclosing an annular packing washer and a spring which presses the washer against an inserted terminal, and presses said terminal against the contracted end zone of said section, each ball-shaped terminal being provided with an annular shoulder surrounding the smaller bore, and adapted to prevent the material of the washer from obstructing said bore.

In testimony whereof I have affixed my signature.

RAYNALDO P. JACQUES.